United States Patent Office 2,789,984
Patented Apr. 23, 1957

2,789,984

PREPARATION OF (5-BENZYLOXY-3-INDOLE)-ALKYLAMINES

Merrill E. Speeter, Kalamazoo Township, Kalamazoo County, Mich., assignor to The Upjohn Company, Kalamazoo, Mich., a corporation of Michigan No Drawing. Application May 24, 1952,
Serial No. 289,871

11 Claims. (Cl. 260—319)

The present invention relates to novel organic compounds, and is more particularly concerned with a novel process for the preparation of (5-benzyloxy-3-indole)-alkylamines, and with the products thus-produced. This application is a continuation-in-part of my prior filed copending application Serial Number 282,273 filed April 14, 1952.

The compounds of the present invention may be represented by the formula:

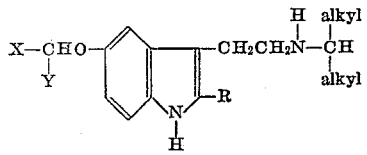

wherein X represents phenyl, halophenyl, lower alkoxyphenyl, or lower alkylphenyl, Y represents hydrogen, phenyl, halophenyl, lower alkoxyphenyl, or lower alkylphenyl, and R represents hydrogen or lower alkyl.

It is an object of the present invention to prepare novel compounds, (5-benzyloxy-3-indole)-alkylamines, and acid addition salts thereof. It is a further object of the present invention to provide a novel process for the preparation of the (5-benzyloxy-3-indole)-alkylamines and acid addition salts thereof. Other objects of the present invention will be apparent to one skilled in the art to which the invention pertains. The novel compounds of the present invention are important intermediates in the preparation of serotonin analogs. Serotonin, 5-hydroxy-3-(2-aminoethyl)-indole creatinine sulfate, [Rapport, J. Biol. Chem. 180, 961, (1949)], has been shown to possess powerful vasoconstrictor qualities. The compounds of the present invention, the (5-benzyloxy-3-indole)-alkylamines are debenzylated when subjected to hydrogenolysis in the presence of a catalyst, such as palladium-charcoal, for example, to yield the serotonin analogs and the thus-produced serotonin analogs have also demonstrated marked vasoconstrictor qualities.

The process of the present invention involves the reductive alkylation of the amino radical of 5-benzyloxy-3-(2-aminoethyl)-indoles, more briefly named, 5-benzyloxytryptamines, represented by the formula:

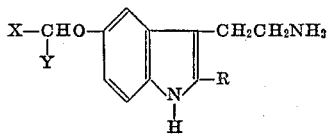

wherein X, Y, and R have the values specified above. Representative 5-benzyloxy-3-(2-aminoethyl)-indoles include the following: 5-benzhydryloxy-3-(2-aminoethyl)-indole, 2-methyl-5-benzyloxy-3-(2-aminoethyl)-indole, 5-(para,para' - dimethylbenzhydryloxy)-3-(2-aminoethyl)-indole, 5 - (para,para'-dimethoxybenzhydryloxy) - 3 - (2-aminoethyl)-indole, 5 - (para,para'-dichlorobenzhydryloxy)-3-(2-aminoethyl)-indole, and the like. The 5-benzyloxy-3-(2-aminoethyl)-indoles are prepared by the reaction of a 5-benzyloxy-3-indoleacetonitrile with a reducing agent such as lithium aluminum hydride, for example, as more fully disclosed in U. S. Patent 2,703,325. The 5-benzyloxy-3-indoleacetonitriles are prepared by the Grignard reaction of a 5-benzyloxyindole represented by the formula:

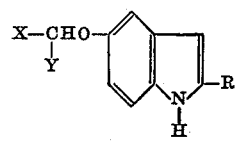

wherein X, Y, and R have the values specified above, with chloroacetonitrile, more fully disclosed in U. S. Patent 2,728,778. The 5-benzyloxyindoles are prepared by the reductive cyclization of 5-benzyloxy-β,2-dinitrostyrenes, as more fully disclosed in my prior filed copending application Serial Number 273,149, filed February 23, 1952, and the 5-benzyloxy-β,2-dinitrostyrenes are prepared by the dehydration of 5-benzyloxy-2-nitro-α-[1-(1-nitroalkyl)] benzyl alcohols, as more fully disclosed in my prior filed copending application Serial Number 273,148, filed February 23, 1952. The 5-benzyloxy-2-nitro-α-[1-(1-nitroalkyl)] benzyl alcohols are prepared by condensation of 5-benzyloxy-2-nitrobenzaldehydes [Burton, J. Chem. Soc. 1935, 1265 or Portmann et al., Helv. Chim. Acta. 31, 1381 (1948)], with a 1-nitroalkane, as more fully disclosed in U. S. Patent 2,698,345.

In the method of the present invention the starting free base, 5-benzyloxy-3-(2-aminoethyl)-indole, dissolved in a suitable solvent such as methanol, ethanol, isopropanol, or the like, is added to a platinum catalyst whereafter a dialkyl ketone, such as acetone, diethyl ketone, methyl ethyl ketone, methyl-n-propyl ketone, ethyl propyl ketone, dipropyl ketone, or the like is added, and the mixture is thereupon subjected to reductive alkylation in an atmosphere of hydrogen. The hydrogen pressure employed for the reductive alkylation may range from slightly under atmospheric to about two or three atmospheres, although higher pressures can also be used. The reaction is usually carried out at a temperature of about 25 degrees centigrade, but also can be conducted satisfactorily in a temperature range between about zero degree centigrade and the boiling point of the solvent employed, for example, between about zero and 100 degrees centigrade. The reaction is usually complete in a period of a few minutes to several hours, with a shorter reaction time, of course, being required at the higher temperatures and greater hydrogen pressures. The desired free base, the (5-benzyloxy-3-indole)-alkylamine, is thereupon obtained, usually as a heavy oil, by filtering to remove the catalyst, and distilling the solvent utilized. The free base is usually converted to a more adaptable crystalline salt such as the hydrochloride, hydrobromide, sulfate, acetate, tartrate, picrate, citrate, or the like, by reacting the free base with a stoichiometric quantity of the corresponding acid. The resulting (5-benzyloxy-3-indole)-alkylamine acid addition salts may be further purified, if so desired, by recrystallizing from an alcohol such as methanol, ethanol, isopropanol, or the like, with isopropanol being preferred. If a 5-benzyloxy-3-(2-aminoethyl)-indole acid addition salt, such as the hydrochloride, sulfate, hydrobromide, picrate, or the like is utilized as the starting compound, the free base is initially isolated by reacting the 5-benzyloxy-3-(2-aminoethyl)-indole acid addition salt, dissolved in water, with an excess of alkali, such as sodium hydroxide, calcium hydroxide, or the like, to liberate the free base. Upon extracting with an organic solvent such as ether, benzene, ethyl acetate, or the like, with ether being preferred, the ether solution is dried and concentrated according to conventional methods, whereupon the isolated free base, 5-benzyloxy-3-(2-aminoethyl)-indole is reacted with a dialkyl ketone in the presence of hydrogen and a platinum catalyst as outlined above.

The following examples will serve to illustrate the process and products of this invention, but the said invention is not to be considered as limited thereto.

*Example 1.—5-benzyloxy-3-[2-(N-isopropylamino)-ethyl]-indole and salts thereof*

To 0.8 gram of 5-benzyloxy-3-(2-aminoethyl)-indole hydrochloride, dissolved in water, was added 25 milliliters of ten percent sodium hydroxide solution and the liberated free base thereafter was extracted with ether. The ether extract was dried with magnesium sulfate, the ether distilled, the remaining oil dissolved in methanol, and the mixture added to 0.25 gram of pre-reduced Adams platinum oxide catalyst. To the resulting mixture was added 0.22 gram of acetone, the mixture shaken with hydrogen at about two atmospheres pressure and at a temperature of about 25 degrees centigrade, and in about thirty minutes the hydrogen consumption was complete. The catalyst was removed by filtration, and the filtrate concentrated by distillation to yield the free base. The free base, dissolved in ether, was reacted with gaseous hydrochloric acid to yield the 5-benzyloxy-3-[2-(N-isopropylamino) - ethyl] - indole hydrochloride which was filtered and recrystallized from isopropanol. The yield of 5-benzyloxy-3-[2-(N-isopropylamino)-ethyl] indole hydrochloride, melting at 201–202 degrees centigrade, was 0.33 gram (forty percent).

*Anal.*—Percent calc. for $C_{20}H_{24}N_2O \cdot HCl$: C, 69.66; H, 7.31. Found: C, 69.95; H, 7.34.

In essentially the same manner as disclosed in Example 1, the following 5-benzyloxy-3-[2-(N-isopropylamino) ethyl]-indoles and acid addition salts thereof are prepared by reacting acetone with the corresponding 5-benzyloxy - 3 - (2-aminoethyl) - indole: 5-(para,para'-dimethylbenzhydryloxy)-3-[2-(N-isopropylamino) - ethyl]-indole, 5-(para,para'-dichlorobenzhydryloxy) - 3 - [2-(N-isopropylamino)-ethyl]-indole, 5-(para,para'-dimethoxybenzhydryloxy)-3-[2-(N-isopropylamino)-ethyl] - indole, 2-methyl-5-benzyloxy - 3 - [2-(N-isopropylamino)-ethyl]-indole, or the like.

*Example 2.—2-methyl-5-benzhydryloxy-3-[2-(N-isopropylamino)-ethyl]-indole and salts thereof*

In essentially the same manner as given in Example 1, 2-methyl-5-benzhydryloxy - 3 - [2-(N-isopropylamino)-ethyl]-indole is prepared by reacting 2-methyl-5-benzhydryloxy-3-(2-aminoethyl)-indole with acetone in the presence of hydrogen and a platinum oxide catalyst and adding a stoichiometric quantity of hydrogen chloride thereto to prepare 2-methyl-5-benzhydryloxy-3-[2-(N-isopropylamino)-ethyl]-indole hydrochloride.

*Example 3.—5-benzyloxy-3-[2-N-(4'-heptylamino)-ethyl]-indole and salts thereof*

In essentially the same manner as given in Example 1, 5-benzyloxy-3-[2-N-(4'-heptylamino)-ethyl]-indole is prepared by reacting 5-benzyloxy-3-(2-aminoethyl)-indole with n-dipropyl ketone in the presence of hydrogen and a platinum oxide catalyst, and adding a stoichiometric quantity of picric acid thereto to prepare 5-benzyloxy-3-[2-N-(4'-heptylamino)-ethyl]-indole picrate.

*Example 4.—5-benzyloxy-3-[2-N-(3'-amylamino)-ethyl]-indole and salts thereof*

In essentially the same manner as given in Example 1, 5-benzyloxy-3-[2-N-(3'-amylamino)-ethyl]-indole is prepared by reacting 5-benzyloxy-3-(2-aminoethyl)-indole with n-diethyl ketone in the presence of hydrogen and a platinum oxide catalyst and adding a stoichiometric quantity of sulfuric acid thereto to prepare 5-benzyloxy-3-[2-N-(3'-amylamino)-ethyl]-indole sulfate.

It is to be understood that this invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the preparation of (5-benzyloxy-3-indole)-alkylamines, the step of reductively alkylating the amino radical of a 5-benzyloxy-3-(2-aminoethyl)-indole with a di-(lower alkyl)-ketone in the presence of hydrogen and a platinum catalyst.

2. In a process for the preparation of (5-benzyloxy-3-indole)-alkylamines, the step of reductively alkylating the amino radical of a 5-benzyloxy-3-(2-aminoethyl)-indole having the formula:

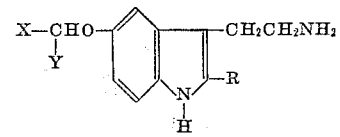

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and R is selected from the group consisting of hydrogen and lower alkyl with a di-(lower alkyl)-ketone in the presence of hydrogen and a platinum catalyst.

3. In a process for the preparation of a 5-benzyloxy-3-[2-(N-isopropylamino)-ethyl]-indole, the step of reductively alkylating the amino radical of a 5-benzyloxy-3-(2-aminoethyl)-indole with acetone in the presence of hydrogen and a platinum catalyst.

4. In a process for the preparation of a 5-benzyloxy-3-[2-(N-isopropylamino)-ethyl]-indole, the step of reductively alkylating the amino radical of a 5-benzyloxy-3-(2-aminoethyl)-indole having the formula:

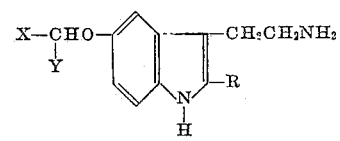

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and R is selected from the group consisting of hydrogen and lower alkyl with acetone in the presence of hydrogen and a platinum catalyst.

5. In a process for the preparation of 5-benzyloxy-3-[2-(N-isopropylamino)-ethyl]-indole, the step of reductively alkylating the amino radical of 5-benzyloxy-3-(2-aminoethyl)-indole with acetone in the presence of hydrogen and a platinum catalyst.

6. A compound selected from the group consisting of (1) a (5-benzyloxy-3-indolyl)-alkylamine having the formula:

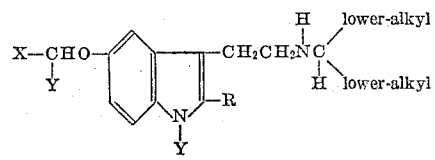

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and R is selected from the group consisting of hydrogen and lower alkyl and (2) acid addition salts thereof.

7. 5 - benzyloxy - 3 - [2 - (N - isopropylamino) - ethyl]-indole hydrochloride.

8. 5 - benzyloxy - 3 [2 - (N - isopropylamino) - ethyl]-indole.

9. 2 - methyl - 5 - benzhydryloxy - 3 - [2 - (N - isopropylamino)-ethyl]-indole hydrochloride.

10. 5 - benzyloxy-3-[2 - N - (4' - heptylamino ethyl]-indole picrate.

11. 5 - benzyloxy - 3 - [2 - N - (3' - amylamino)-ethyl]-indole sulfate.

References Cited in the file of this patent

UNITED STATES PATENTS

| | | |
|---|---|---|
| 1,793,176 | Klarer et al. | Feb. 17, 1931 |
| 2,416,258 | Jenkins et al. | Feb. 18, 1947 |

OTHER REFERENCES

Adams et al.: Organic Reactions, vol. 4, pp. 182–183.

J. Chem. Soc. (London) p. 1726 (1937).

The Chemistry of Heterocyclic Compounds (Indole and Carbazole), Sumpter et al., Interscience Pub. Inc., N. Y., 1954, pp. 199–200.